(12) United States Patent
Wu

(10) Patent No.: US 7,594,415 B1
(45) Date of Patent: Sep. 29, 2009

(54) WHEEL CLAMP

(76) Inventor: Chun-Hsien Wu, No. 717, Sec. 1, An Zhong Rd., Tainan City (TW)

( * ) Notice: Subject to any disclaimer, the term of this patent is extended or adjusted under 35 U.S.C. 154(b) by 0 days.

(21) Appl. No.: 12/325,506

(22) Filed: Dec. 1, 2008

(51) Int. Cl.
B60R 25/00 (2006.01)

(52) U.S. Cl. .................. 70/18; 70/19; 70/226; 70/360; 188/32

(58) Field of Classification Search ..................... 70/14, 70/18, 19, 208, 209, 225, 226, 237, 259, 70/260, 360; 188/32
See application file for complete search history.

(56) References Cited

U.S. PATENT DOCUMENTS

| 1,796,194 | A | * | 3/1931 | Ellenberger | .................. | 70/260 |
| 1,819,813 | A | * | 8/1931 | Ellenberger | .................... | 70/19 |
| 2,098,012 | A | * | 11/1937 | Papst | ............................ | 70/208 |
| RE24,712 | E | * | 10/1959 | Marugg | ........................ | 70/225 |
| 2,960,857 | A | * | 11/1960 | Winter | ........................... | 70/19 |
| 4,441,586 | A | * | 4/1984 | Bernier | ......................... | 188/32 |
| 5,782,117 | A | * | 7/1998 | Xavier | ......................... | 70/226 |
| 5,862,688 | A | * | 1/1999 | Odegard | ......................... | 70/19 |
| 5,865,048 | A | * | 2/1999 | Beavers et al. | .................. | 70/18 |
| 5,873,275 | A | * | 2/1999 | Lukich | ......................... | 70/226 |
| 5,996,736 | A | * | 12/1999 | Stankiewicz | ................ | 182/127 |
| 6,032,497 | A | * | 3/2000 | Fulcher et al. | .................. | 70/19 |
| 6,427,885 | B1 | * | 8/2002 | Dexel | ....................... | 224/42.24 |
| 6,896,232 | B2 | * | 5/2005 | Crowell et al. | ........... | 248/316.4 |
| 7,032,416 | B1 | * | 4/2006 | Wu | ............................... | 70/19 |
| 2002/0078722 | A1 | * | 6/2002 | Corey | ........................... | 70/208 |
| 2004/0188187 | A1 | * | 9/2004 | Curl | ............................ | 188/32 |
| 2005/0076685 | A1 | * | 4/2005 | Vegvary | ....................... | 70/226 |

* cited by examiner

Primary Examiner—Lloyd A Gall
(74) Attorney, Agent, or Firm—Rosenberg, Klein & Lee

(57) ABSTRACT

A wheel clamp includes a clamp body, a movable rod pivotally connected to the clamp body, a connecting rod fitted on the movable rod, and a rotating unit disposed in a lock core seat of the clamp body. The connecting rod has a threaded section for connecting with a screw. The rotating unit has a rotating rod to be inserted into an accommodating trough of the screw. A first engaging member is secured to the accommodating trough of the screw. A second engaging member is secured to the rotating rod of the rotating unit. The second engaging member has a second engaging block to mesh with and drive a first engaging block of the first engaging member so the connecting rod is able to be moved relative to the screw.

15 Claims, 15 Drawing Sheets

WHEEL CLAMP

BACKGROUND OF THE INVENTION

1. Field of the Invention

The present invention relates to a wheel clamp, and more particularly to one having a second engaging member with a second engaging block to mesh with and drive a first engaging block of a first engaging member so a connecting rod is able to be moved relative to a screw. A rotating unit is used to rotate the connecting rod to open a movable rod relative to a clamp body.

2. Description of the Prior Art

As shown in FIG. 15, a conventional wheel clamp disclosed in UK Patent No. GB2179607 comprises an L-shaped clamp body A. One end of the clamp body A is pivotally connected with a movable rod A1. The clamp body A is provided with a connecting rod A2 inserted on the movable rod A1 for moving the movable rod A1. The connecting position of the connecting rod A2 and the clamp body A is provided with a lock core A3 to secure the connecting rod A 2 when the clamp body A is engaged with a wheel. To unlock the wheel clamp, the lock core A3 is unlocked, the clamp body A is disengaged from the wheel, and then a rod-shaped manual tool is used to extend into the connecting rod for adjusting the length of the connecting rod to move the movable rod A1 for disengagement. This is very inconvenient in use because the lock core A3 has to be disengaged from the clamp body A, a rod-shaped manual tool is required for adjustment, and the tool may be lost.

SUMMARY OF THE INVENTION

The primary of the present invention is to overcome the aforesaid shortcomings.

According to the present invention, there is provided a wheel clamp, comprising:

a clamp body, having a positioning section and a pivot section to connect with a movable rod, the clamp body being provided with a lock core seat, the lock core seat having a pin to connect with an outer sleeve, the outer sleeve comprising a connecting rod, the connecting rod having a connecting section for insertion of the movable rod, the connecting rod further having a threaded section for engagement of a screw;

a rotating unit, disposed in the lock core seat, the rotating unit comprising a lock core, a recess being formed close to the lock core seat, the lock core comprising a pull section corresponding to the recess, the screw having an accommodating trough, the accommodating trough being provided with a resilient member, the rotating unit further comprising a rotating rod to be inserted into the accommodating trough;

a first engaging member, secured to the accommodating trough of the screw, the first engaging member comprising a first engaging block; and a second engaging member, secured to the rotating rod of the rotating unit, the second engaging member comprising at least a second engaging block to mesh with the first engaging block.

Preferably, the clamp body is shaped like English capital letter L which is hollow, and has two closed ends.

Preferably, the positioning section of the clamp body is in the form of a sleeve.

Preferably, the movable rod is formed with a rack portion.

Preferably, the recess is formed along at least one side of the lock core seat.

Preferably, the rotating unit comprises a pull section corresponding to the recess of the lock core seat.

Preferably, the pull section is shaped like English letter "l" or English capital letter "L".

Preferably, the lock core seat has a first pin hole and the outer sleeve has a second pin hole for insertion of the pin.

Preferably, the resilient member is a spring.

Preferably, the screw is provided with a washer at an outer edge of the screw.

Preferably, the lock core seat has a lock hole and the lock core has a block corresponding in position to the lock hole.

Preferably, the rotating rod of the rotating unit has a through hole and the second engaging member is in the form of a pin having two engaging blocks at two ends thereof, the second engaging member inserting into the through hole of the rotating rod.

Preferably, the clamp body is provided with a shield member next to the positioning section, the clamp body further having a first threaded hole, the shield member having a second threaded hole, a fastening member inserting into the second threaded hole and the first threaded hole to secure the shield member to the clamp body.

Preferably, the fastening member is a screw.

Preferably, the movable rod is provided with a wrinkled protecting member at a connecting portion of the movable rod and the pivot section, the movable rod having notches for insertion of wrinkled ends of the protecting member.

Preferably, the movable rod is hollow and has two closed ends.

The present invention has the following advantages:

1. The present invention uses the second engaging block to mesh with and drive the first engaging block so the rotating unit is able to rotate the screw for adjusting the open distance between the movable rod and the clamp body. It is convenient in use without an adjusting tool.

2. The rotating unit of the present invention is limited within the lock core seat, and will not depart from the lock core seat.

3. The present invention has the recess formed at one side or two sides of the lock core seat for receiving the pull section of the rotating unit, preventing awkward carrying, damage or collision.

DETAILED DESCRIPTION OF THE PREFERRED EMBODIMENTS

Figure 1:
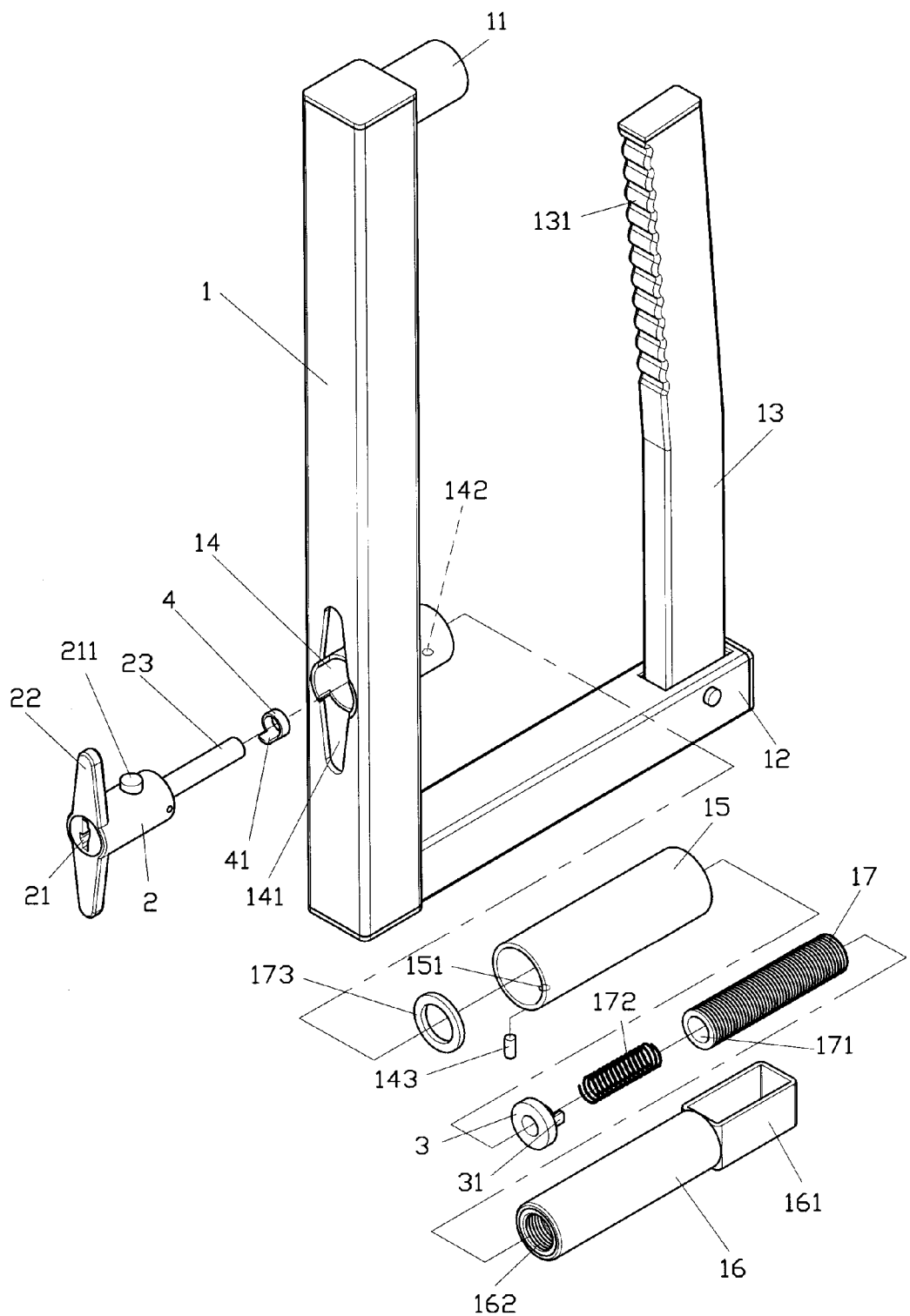
FIG. 1 an exploded view according to a first preferred embodiment of the present invention.
Figure 2:
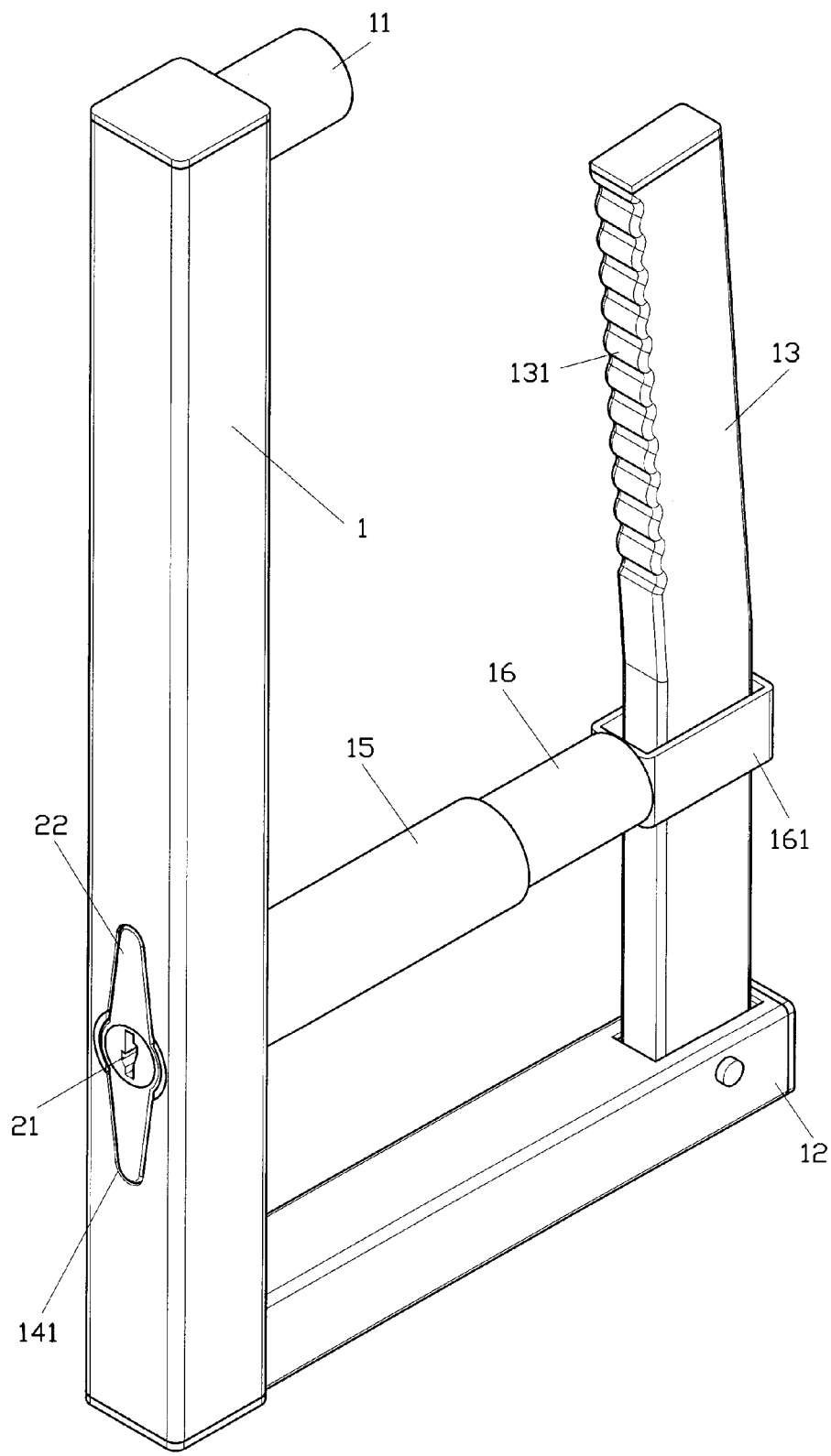
FIG. 2 is a perspective view according to the first preferred embodiment of the present invention.
Figure 3:
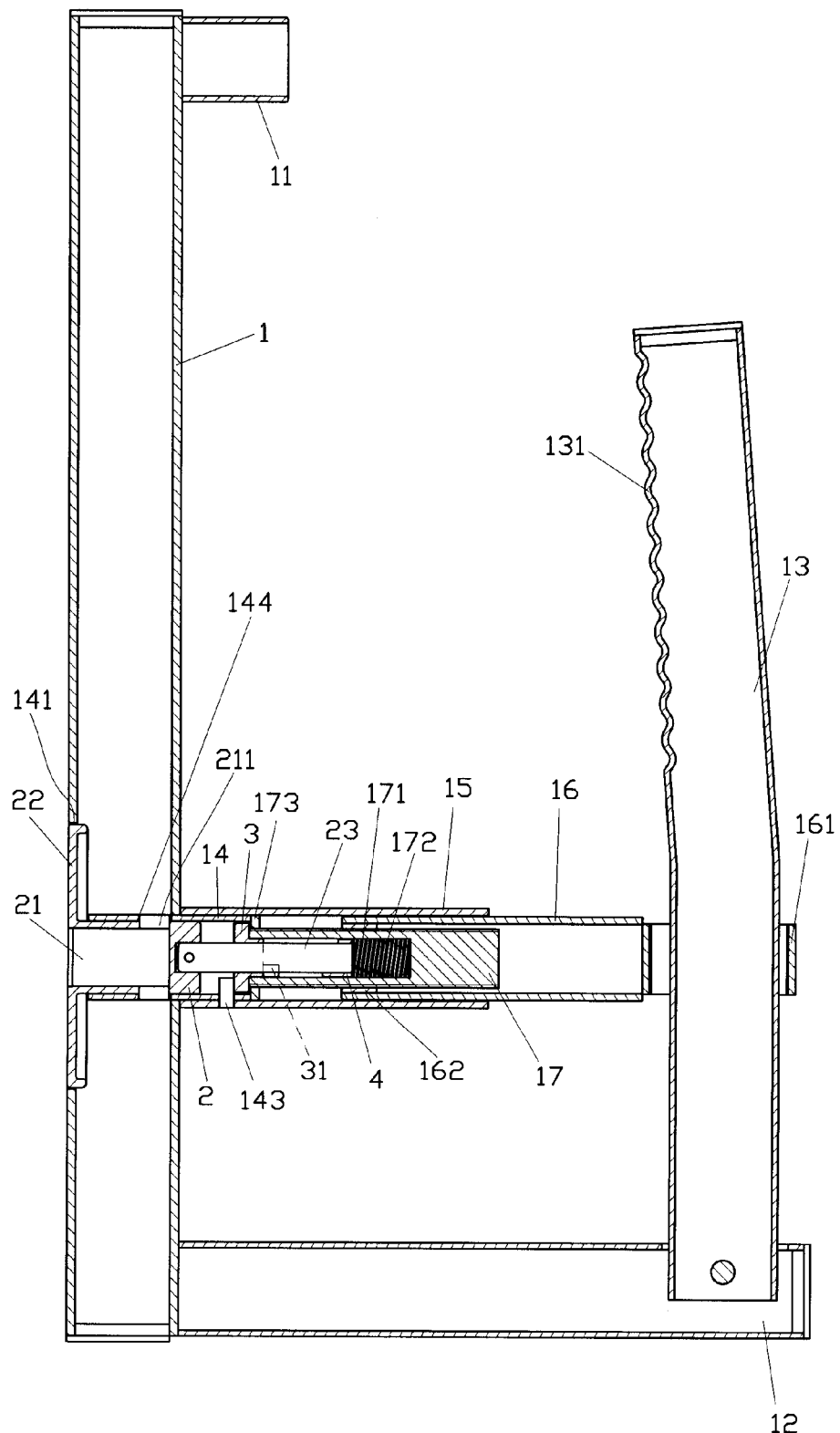
FIG. 3 is a cross-sectional view according to the first preferred embodiment of the present invention.
Figure 4:
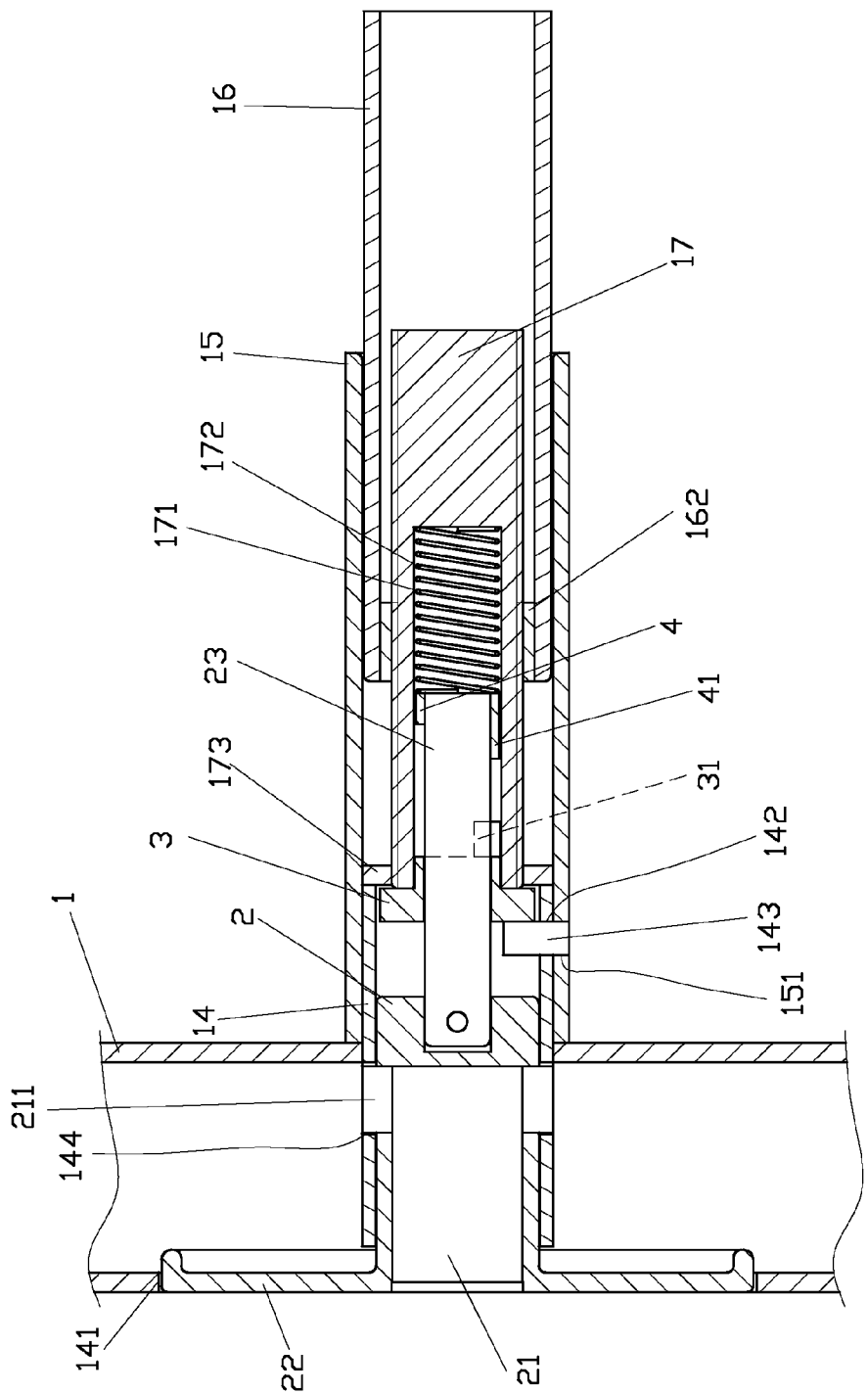
FIG. 4 is a cross-sectional view showing a rotating unit and a screw according to the first preferred embodiment of the present invention.

As shown in FIGS. 1 through 4, a first preferred embodiment of the present invention comprises a clamp body 1, a rotating unit 2, a first engaging member 3, and a second engaging member 4.

The hollow clamp body 1 is shaped like an English capital letter "L" having two closed ends, and comprises a positioning section 11 at one end and a pivot section 12 at the other end thereof. The pivot section 12 is pivotally connected with a hollow movable rod 13 which has closed upper and lower ends. The movable rod 13 is formed with a rack portion 131 at an upper section thereof. The clamp body 1 is provided with a lock core seat 14 at a middle section thereof and a recess 141 close to one end of the lock core seat 14. The recess 141 is disposed at one side or two opposite sides of the lock core seat 14. The other end of the lock core seat 14 is formed with a first pin hole 142 for insertion of a pin 143 connected to an outer sleeve 15. The outer sleeve 15 is formed with a second pin hole 151 for insertion of the pin 143. The outer end of the lock core seat 14 is formed with a lock hole 144. A connecting rod 16 is inserted into the outer sleeve 15. The connecting rod 16 has a connecting section 161 at one end and a threaded section 162 at the other end thereof. The movable rod 13 is inserted through the connecting section 161 of the connecting rod 16. A screw 17 is screwed into the threaded section 162 of the connecting rod 16. The screw 17 has an accommodating trough 171 at one end for insertion of a resilient member 172. The resilient member 172 is a spring. A washer 173 is provided at the edge of the screw 17.

The rotating unit 2 is inserted into the lock core seat 14, and comprises a lock core 21 at one end thereof. The lock core 21 comprises a block 211 thereon for extending into the lock hole 144 of the lock core seat 14 when in a locked status. The lock core 21 further comprises a pull section 22 corresponding in shape to the recess 141 of the lock core seat 14. The pull section 22 may be shaped like English letter "l" or English capital letter "L" to be accommodated in the recess 141 of the lock core seat 14, preventing awkward carrying, damage or collision. The rotating unit 2 further comprises a rotating rod 23 at the other end thereof. The rotating rod 23 is inserted into the accommodating trough 171 of the screw 17 to compress the resilient member 172.

The first engaging member 3 is secured to an open end of the accommodating trough 171 of the screw 17. The first engaging member 3 has a first engaging block 31 protruding from the end facing the accommodating trough 171.

The second engaging member 4 is secured to the end of the rotating rod 23 of the rotating unit 2. One end of the engaging member 4 has a second engaging block 41 facing and corresponding in position to the first engaging block 31 of the first engaging member 3 for meshing with the first engaging block 31.

Figure 5:
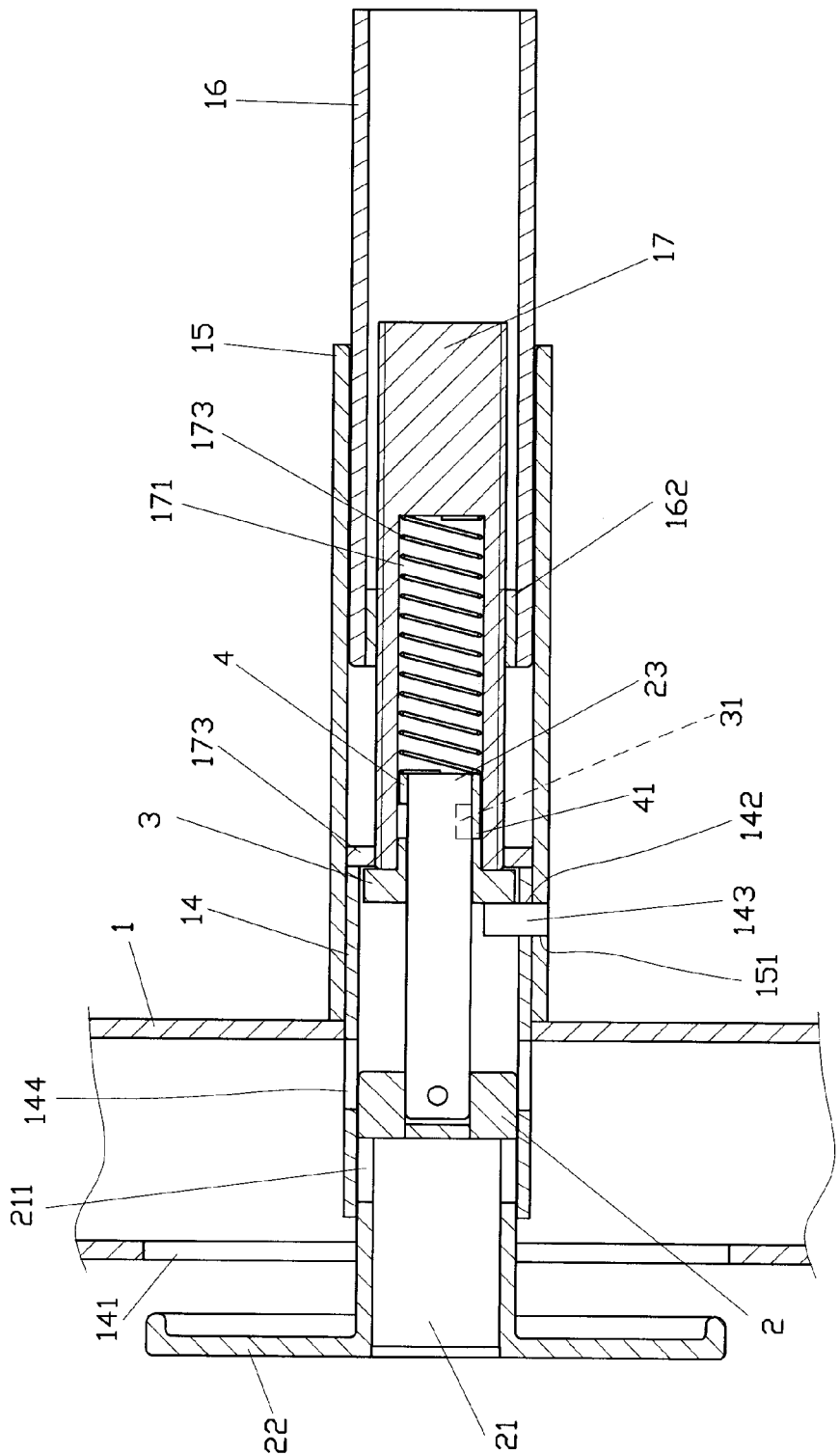
FIG. 5 is a cross-sectional view showing the rotating unit retreated from a lock core seat according to the first preferred embodiment of the present invention.
Figure 6:
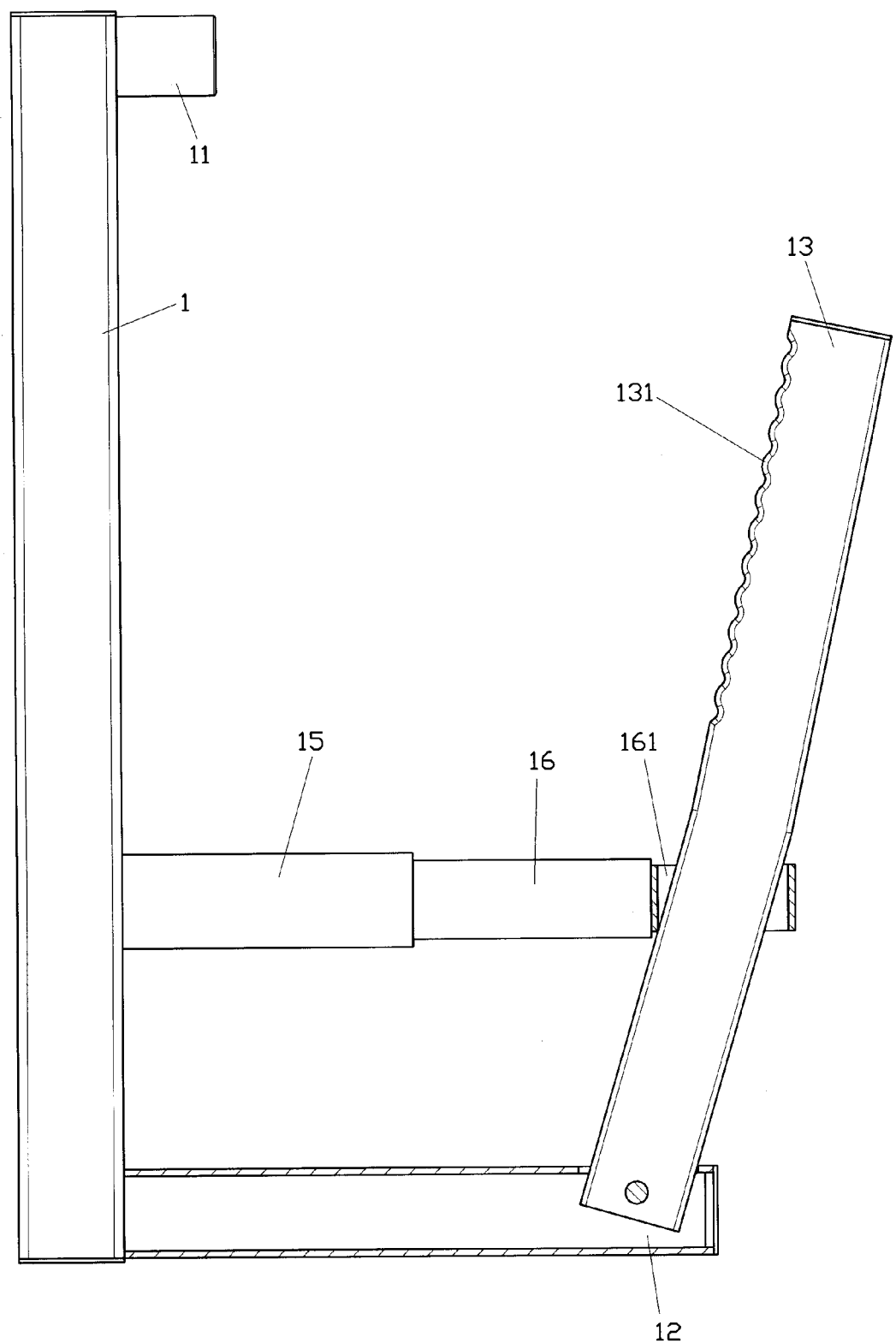
FIG. 6 is a schematic view showing a movable rod and a clamp body in an open status according to the first preferred embodiment of the present invention.
Figure 7:
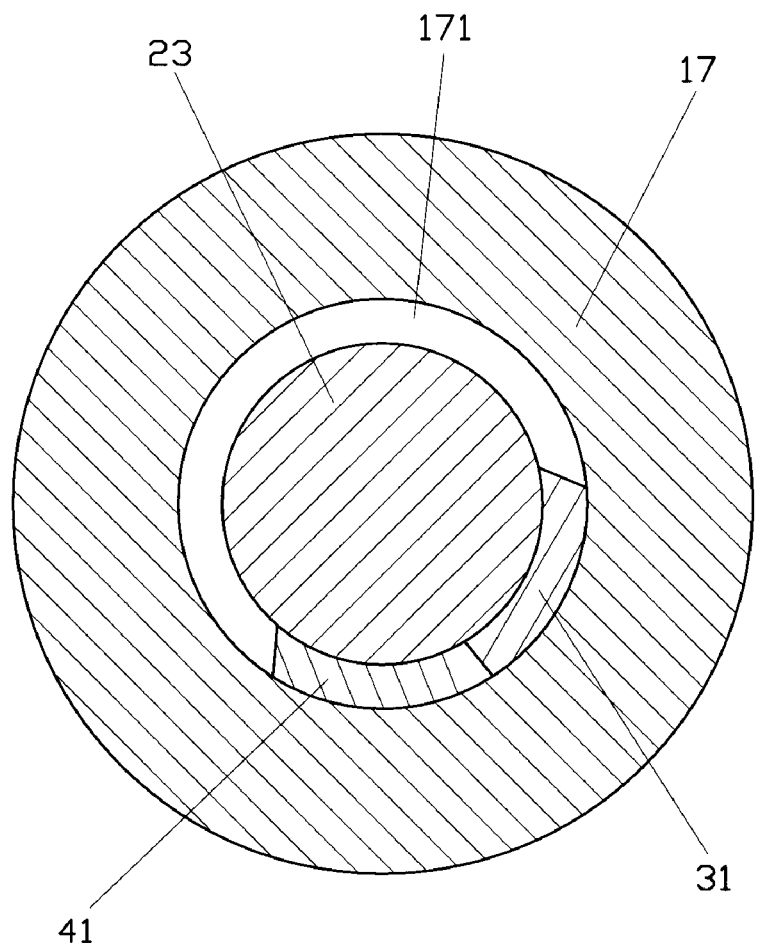
FIG. 7 is a schematic view showing a first engaging member meshing with a second engaging member according to the first preferred embodiment of the present invention.
Figure 8:
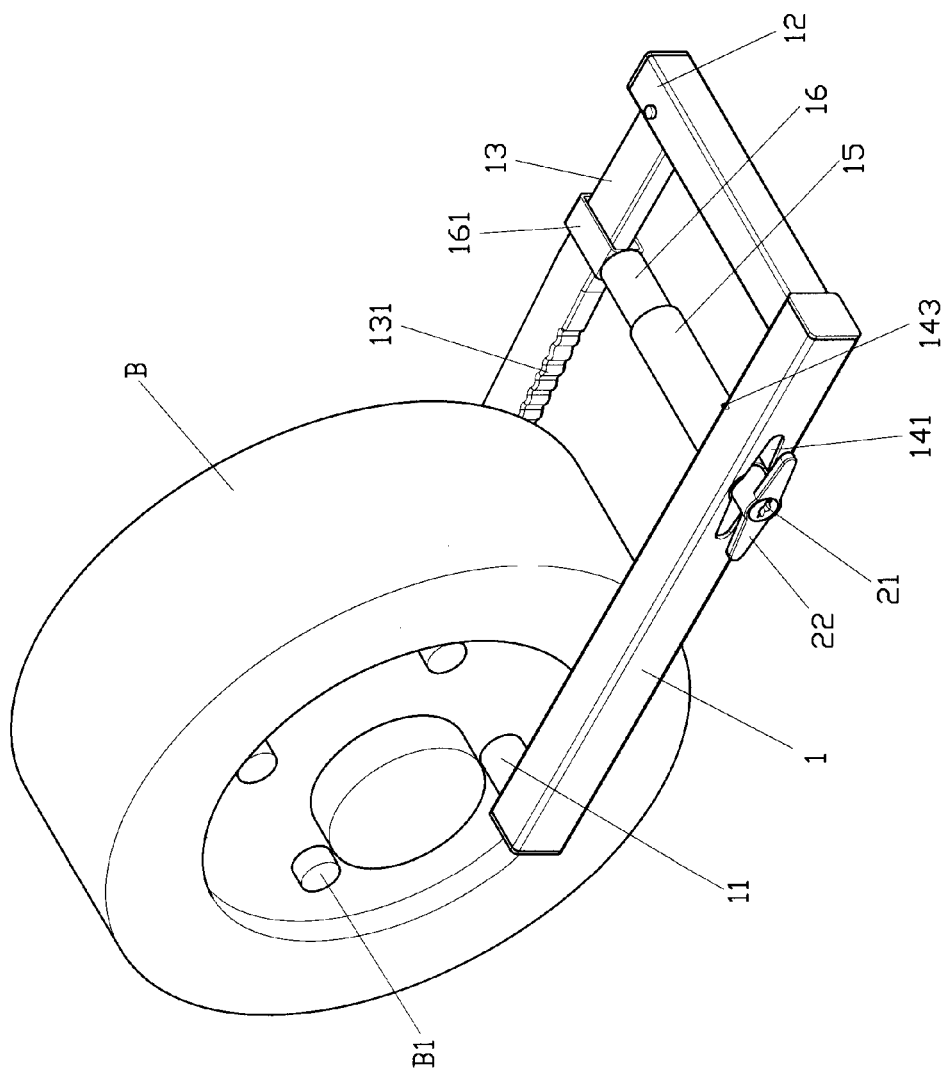
FIG. 8 is a schematic view showing the first preferred embodiment of the present invention applied to a wheel.

To use the present invention, as shown in FIGS. 5 and 6, when the lock core 21 of the rotating unit 2 is unlocked, the block 211 will be retracted and not engaged with the lock hole 144 of the lock core seat 14. (This is a conventional disengaging technique, and doesn't be described hereinafter.) The rotating rod 23 of the rotating unit 2 is pushed outward within the outer sleeve 15 by the elasticity of the resilient member 172. The second engaging block 41 of the second engaging member 4 on the rotating rod 23 is stopped by the first engaging member 3 secured to the screw 17 so the rotating rod 23 will not be pushed out. The rotating unit 2 retreats from the lock core seat 14, and the pull section 22 retreats from the recess 141 of the lock core seat 14. The pull section 22 is rotated to turn the rotating rod 23 which brings the second engaging block 41 of the second engaging member 4 to mesh with and drive the first engaging block 31 of the first engaging member 3 to rotate, as shown in FIG. 7. The screw 17 is driven to rotate. The first engaging member 3 on the screw 17 is stopped by the pin 143 in the second pin hole 151 of the outer sleeve 15 and the first pin hole 142 of the lock core seat 14, so the screw 17 is rotated without moving the connecting rod 16 connected with the screw 17 rearward. The threaded section 162 is rotated and moved with respect to the screw 17. The connecting section 161 of the connecting rod 16 brings the movable rod 13 on the pivot section 12 of the clamp body 1 to turn, thus the movable rod 13 is opened to a desired position with respect to the clamp body 1. The positioning section 11 of the clamp body 1 is fitted onto a bolt B1 provided on an outer side of a wheel B, as shown in FIG. 8. The pull section 22 of the rotating unit 2 is rotated in the reverse direction. The threaded section 162 is also rotated in the reverse direction with respect to the screw 17 until the rack portion 131 of the movable rod 13 engages with an inner edge of the wheel B. Finally, the rotating unit 2 is pushed in the lock core seat 14, and the rotating rod 23 is to compress the resilient member 172 again. The lock core 21 is locked, which brings the block 211 to extend end engage with the lock hole 144 of the lock core seat 14. The rotating unit 2 will not disengage from the lock core seat 14. The second engaging block 41 of the second engaging member 4 doesn't mesh with the first engaging block 31 of the first engaging member 3. Thus, the clamp body 1 is secured to the wheel B, providing a burglarproof effect.

Figure 9:
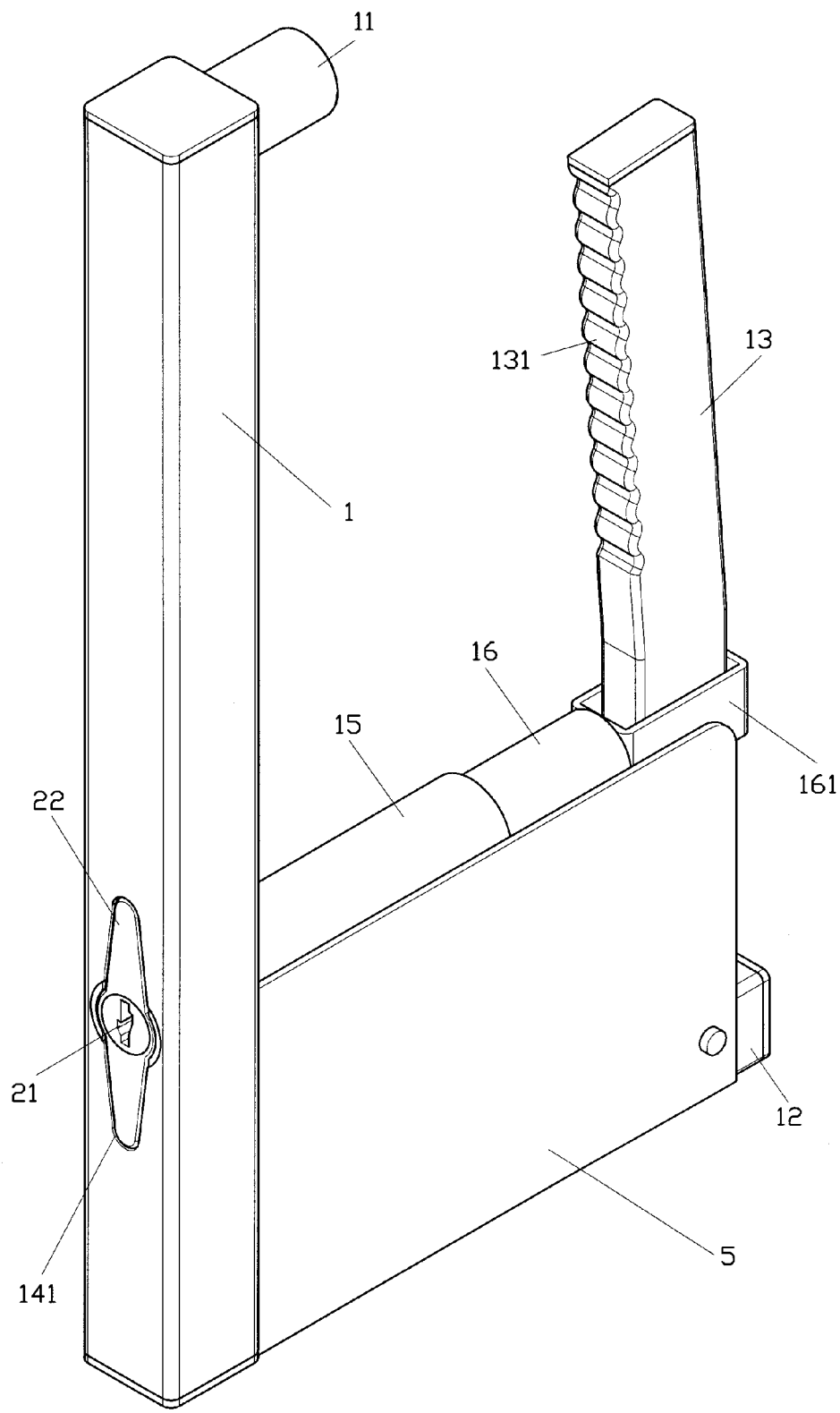
FIG. 9 is a perspective view according to a second preferred embodiment of the present invention.

FIG. 9 shows a second embodiment of the present invention, which is substantially similar to the aforesaid first embodiment with the exceptions described hereinafter. The clamp body 1 is provided with a protecting board 5, enhancing the burglarproof effect.

Figure 10:
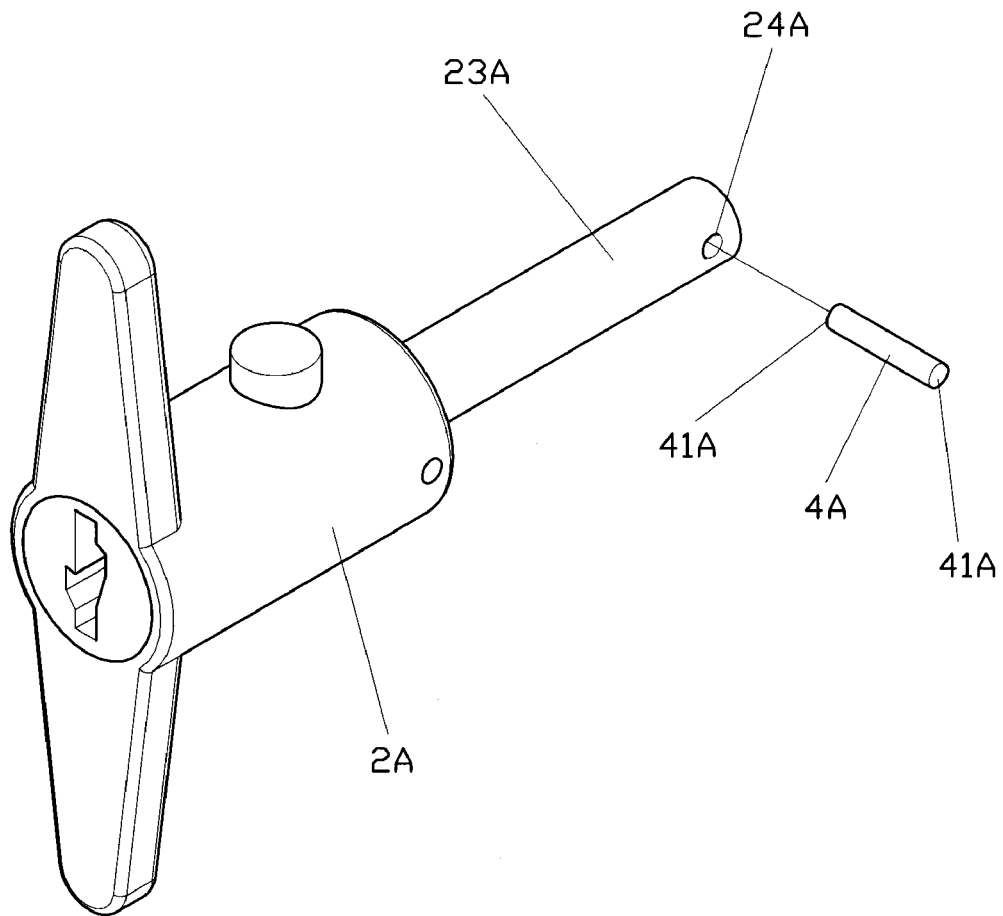
FIG. 10 is a perspective view showing a rotating rod and a second engaging member according to a third preferred embodiment of the present invention.
Figure 11:
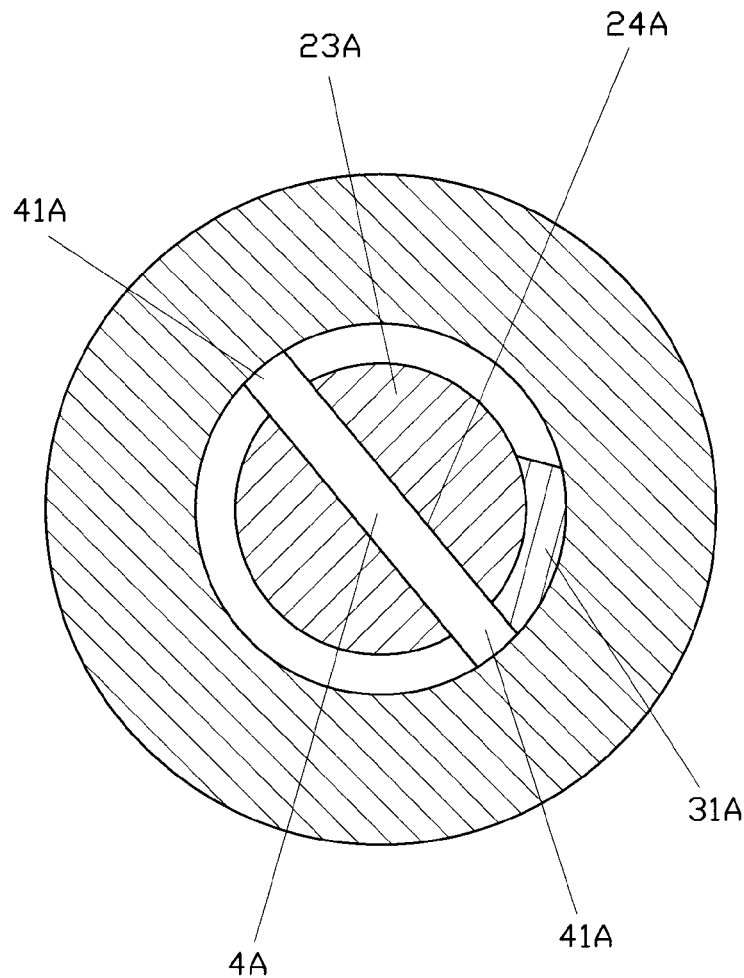
FIG. 11 is a schematic view showing the engagement of a first engaging block and engaging blocks according to the third preferred embodiment of the present invention.

FIGS. 10 and 11 show a third embodiment of the present invention, which is substantially similar to the aforesaid first embodiment with the exceptions described hereinafter. A rotating rod 23A of a rotating unit 2A has a through hole 24A. A second engaging member 4A is in the form of a pin having two second engaging blocks 41A at two ends thereof. The second engaging member 4A is inserted through the through hole 24A of the rotating rod 23A. When the second engaging blocks 41A are turned, they will mesh with a first engaging block 31A for bearing more meshing force, avoiding deformation or break.

Figure 12:
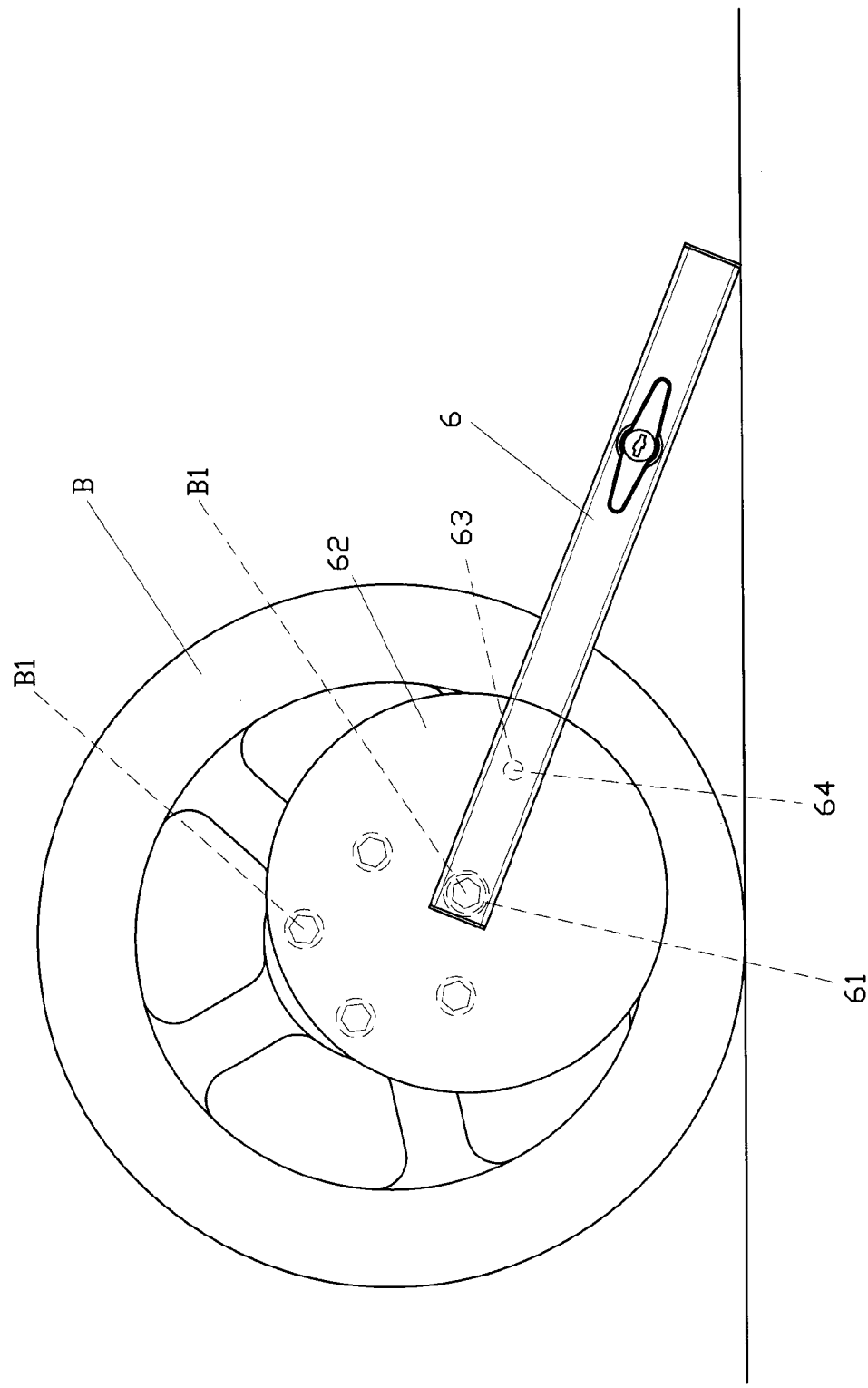
FIG. 12 is a schematic view of a fourth preferred embodiment of the present invention in use.
Figure 13:
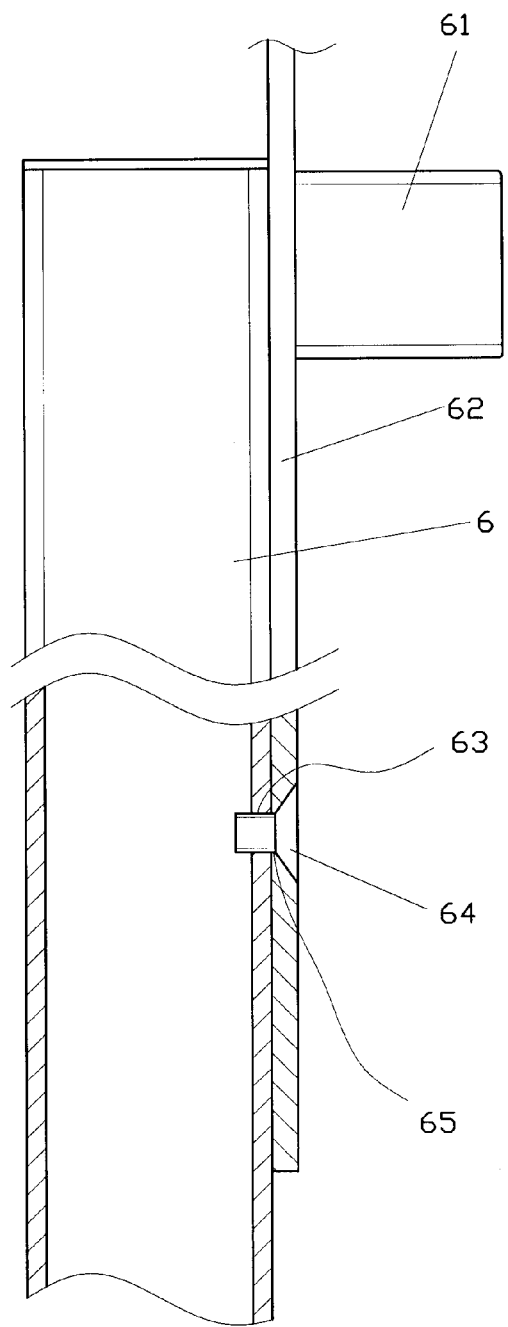
FIG. 13 is a partially sectional view of the fourth preferred embodiment of the present invention.

FIGS. 12 and 13 show a fourth embodiment of the present invention, which is substantially similar to the aforesaid first embodiment with the exceptions described hereinafter. A shield member 62 is disposed next to a positioning section 61 of a clamp body 6. The clamp body 6 has a first threaded hole 63 and the shield member 62 has a second threaded hole 65. A fastening member 64 in the form of a screw is screwed into the second threaded hole 65 and the first threaded hole 63 for securing the shield member 62 to the clamp body 6. When the positioning section 61 of the clamp body 6 is fitted on the bolt B1 of the wheel B, the shield member 62 will block the bolt B1 of the wheel B, preventing it from damage.

Figure 14:
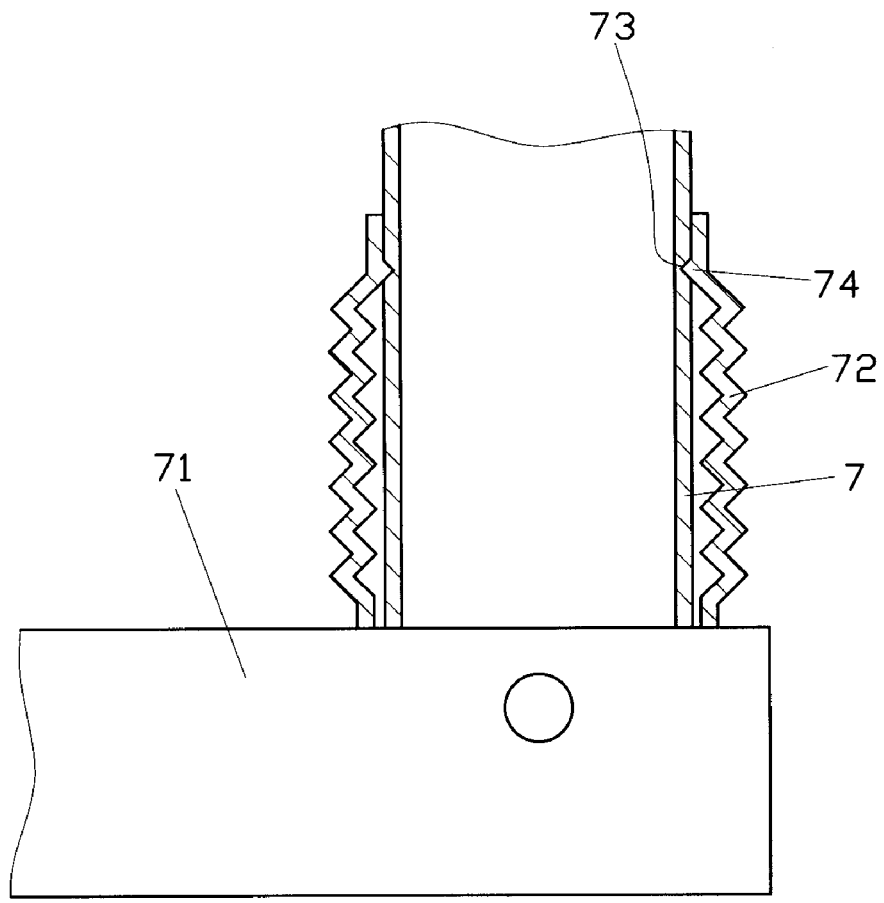
FIG. 14 is a partially sectional view of a fifth preferred embodiment of the present invention.
Figure 15:
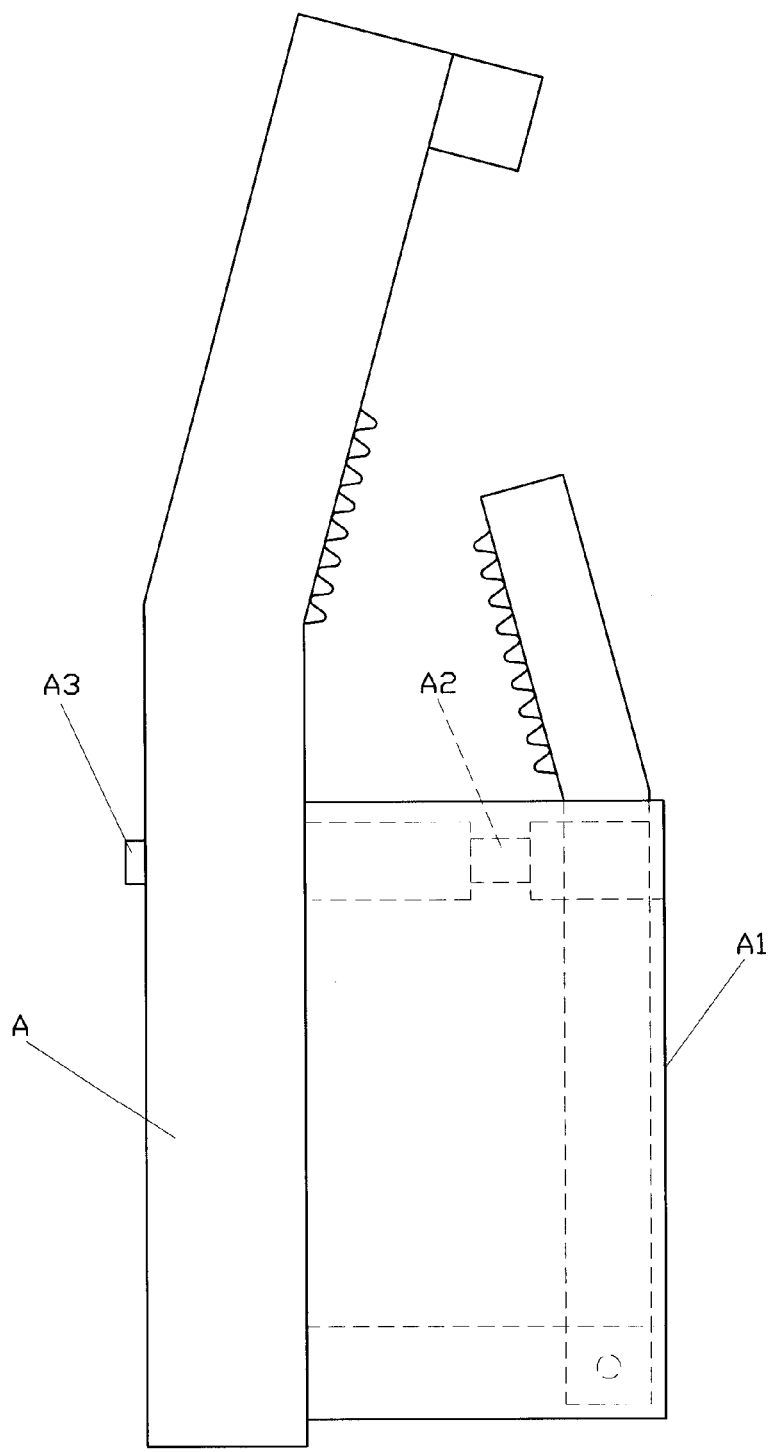
FIG. 15 is a schematic view of the prior art.

FIG. 14 shows a fifth embodiment of the present invention, which is substantially similar to the aforesaid first embodiment with the exceptions described hereinafter. A protecting member 72 is provided on a movable rod 7 at a connecting portion of the movable rod 7 and a pivot section 71. The protecting member 72 is made of rubber material in a wrinkled square shape. The movable rod 7 has engaging notches 73 for insertion of wrinkled ends 74 of the protecting member 72, preventing the protecting member 72 from disengagement. The protecting member 72 provides waterproof and dustproof effects.

What is claimed is:

1. A wheel clamp, comprising:
  a clamp body, having a positioning section and a pivot section to connect with a movable rod, the clamp body being provided with a lock core seat, the lock core seat having a pin to connect with an outer sleeve, the outer sleeve comprising a connecting rod, the connecting rod having a connecting section for insertion of the movable rod, the connecting rod further having a threaded section for engagement of a screw;
  a rotating unit, disposed in the lock core seat, the rotating unit comprising a lock core, a recess being formed close to the lock core seat, the lock core comprising a pull section corresponding to the recess, the screw having an accommodating trough, the accommodating trough being provided with a resilient member, the rotating unit further comprising a rotating rod to be inserted into the accommodating trough;
  a first engaging member, secured to the accommodating trough of the screw, the first engaging member comprising a first engaging block; and
  a second engaging member, secured to the rotating rod of the rotating unit, the second engaging member comprising at least a second engaging block to mesh with the first engaging block.

2. The wheel clamp as claimed in claim 1, wherein the clamp body is shaped like English capital letter "L" which is hollow, and has two closed ends.

3. The wheel clamp as claimed in claim 1, wherein the positioning section of the clamp body is in the form of a sleeve.

4. The wheel clamp as claimed in claim 1, wherein the movable rod is formed with a rack portion.

5. The wheel clamp as claimed in claim 1, wherein the recess is formed along at least one side of the lock core seat.

6. The wheel clamp as claimed in claim 5, wherein the rotating unit comprises a pull section corresponding to the recess of the lock core seat.

7. The wheel clamp as claimed in claim 1, wherein the lock core seat has a first pin hole and the outer sleeve has a second pin hole for insertion of the pin.

8. The wheel clamp as claimed in claim 1, wherein the resilient member is a spring.

9. The wheel clamp as claimed in claim 1, wherein the screw is provided with a washer at an outer edge of the screw.

10. The wheel clamp as claimed in claim 1, wherein the lock core seat has a lock hole and the lock core has a block corresponding in position to the lock hole.

11. The wheel clamp as claimed in claim 1, wherein the rotating rod of the rotating unit has a through hole and the second engaging member is in the form of a pin having two engaging blocks at two ends thereof, the second engaging member inserting into the through hole of the rotating rod.

12. The wheel clamp as claimed in claim 1, wherein the clamp body is provided with a shield member next to the positioning section, the clamp body further having a first threaded hole, the shield member having a second threaded hole, a fastening member inserting into the second threaded hole and the first threaded hole to secure the shield member to the clamp body.

13. The wheel clamp as claimed in claim 12, wherein the fastening member is a screw.

14. The wheel clamp as claimed in claim 12, wherein the movable rod is provided with a wrinkled protecting member at a connecting portion of the movable rod and the pivot section, the movable rod having notches for insertion of wrinkled ends of the protecting member.

15. The wheel clamp as claimed in claim 12, wherein the movable rod is hollow.

* * * * *